3,344,027
STABLE SUSPENSION OF IRON SALTS
William J. Hughes, Bridgeton, Mo., assignor to Mallinckrodt Chemical Works, St. Louis, Mo., a corporation of Missouri
No Drawing. Filed June 16, 1965, Ser. No. 464,556
5 Claims. (Cl. 167—68)

This invention relates to improved pharmaceutical compositions and more particularly to stable suspensions of iron compounds.

Briefly, the present invention is directed to stable pharmaceutical suspensions of relatively insoluble ferrous compounds, especially ferrous fumarate.

Among the objects of the invention may be mentioned the provision of improved pharmaceutical compositions of iron compounds; the provision of compositions of the type described which contain ferrous fumarate; the provision of preparations of the type described containing vegetable gum; and the provision of methods of preparing pharmaceutical compositions of the type described. Other objects and features will be in part apparent and in part pointed out hereinafter.

The invention accordingly comprises the products and methods hereinafter described, the scope of the invention being indicated in the following claims.

The present invention is directed to stable pharmaceutical compositions comprising a relatively insoluble ferrous compound, a vegetable gum and colloidal synthetic silica in an aqueous vehicle.

Various ferrous salts have been used as sources of iron for oral administration for the prevention and/or remedy of iron deficiency anemia. While such compounds are most frequently presented in the form of dry compositions, such as tablets and capsules, there is a need for liquid dosage forms of such compounds, particularly for administration to children.

It is widely accepted that ferrous iron is the preferred form of iron for oral administration. However, the preparation of stable liquid ferrous iron compositions presents one of the more difficult pharmaceutical formulation problems. While solutions of soluble iron salts such as ferrous sulfate have a uniform composition when freshly prepared, they are highly susceptible to oxidation and they tend to deteriorate rapidly on the shelf.

Essentially insoluble iron salts may be formulated as suspensions, but the suspensions tend to settle and separate, in addition to being subject to oxidative deterioration as in the case of the soluble salts.

One of the conventional approaches to the stabilization of pharmaceutical suspensions is the inclusion in the composition of a vegetable gum, such as tragacanth. However, the use of such gums in suspension of iron compounds often results in pharmaceutical incompatibilities.

The non-hydrated ferrous fumarate described by H. C. Bertsch and J. F. Lemp (United States Patent No. 2,848,366) has gained wide acceptance as a superior form of ferrous iron for iron therapy, but its formulation in liquid preparations has encountered many of the difficulties encountered in the formulation of the older iron compounds. United States Patent No. 2,985,559, of C. L. J. Coles, describes a pharmaceutical suspension of ferrous fumarate in a syrupy vehicle containing lecithin. While it was the object of the patentee to provide a relatively stable suspension, exeprience has indicated that the Coles suspension is not shelf-stable over long periods of time.

It has now been found in accordance with the present invention, that relatively insoluble ferrous compounds may be formulated into stable pharmaceutical suspensions with the aid of a combination of a vegetable gum and a colloidal synthetic silica.

The preferred ferrous compound for use in the compositions of the invention is the non-hydrated ferrous fumarate of Bertsch and Lemp. However, other relatively insoluble ferrous compounds, such as ferrous tartrate may also be utilized.

Although any of the pharmaceutically acceptable vegetable gums such as acacia, karaya or guar gums may be used, the preferred gum for use in the compositions of the invention is tragacanth.

Several types of colloidal synthetic silica are available. These vary in particle size and surface area, depending on the method of preparation. The types that are useful in the present invention are those having a surface area greater than about 175 m.$^2$/g. and a particle size less than about 0.1 micron. Preferably, the silica should have a surface area of about 200 m.$^2$/g. or more and a particle size of about 0.01–0.02 micron. Suitable types of silica for use in the present invention include silica aerogels such as that supplied by the Monsanto Company, St. Louis, Mo., under the trade designation "Santocel" and a submicroscopic silica prepared by the high temperature vapor phase hydrolysis of silicon tetrachloride, such as that supplied by the Cabot Corporation, Boston, Mass., under the trade designation "Cab-O-Sil."

As aqueous vehicles for use in the compositions of the invention, aqueous solutions of highly soluble pharmaceutically acceptable polyols and sugars are suitable. Particularly useful for the purpose are concentrated aqueous solutions of sorbitol, although other polyols, such as glycerine may be used. Such polyols provide body to the vehicle, contribute toward a pleasing flavor, and enhance absorption of ferrous fumarate from the gastrointestinal tract.

Conventional flavoring and coloring agents may be added as desired to improve the taste and color appeal of the finished preparation. Also, it is usually desirable to incorporate a small proportion of a conventional preservative, such as sodium benzoate, to inhibit mold or bacterial attack on the susceptible ingredients, such as the polyol and the vegetable gum.

Although ferrous fumarate demonstrates the usual incompatibility with vegetable gums that is characteristic of iron salts generally, it has been found, in accordance with the invention, that the incorporation of colloidal synthetic silica with the gum overcomes the traditional instability and leads to stable suspensions of exceptional shelf life.

In general, the amounts of vegetable gum and colloidal synthetic silica employed to effect stabilization of suspensions of relatively insoluble ferrous compounds in accordance with the invention may vary widely but preferably range from about 17.5–37.5% by weight of vegetable gum and about 7.5–25.0% by weight of colloidal synthetic silica, based upon the weight of the ferrous compound. Further, the ratio of silica to vegetable gum in the compositions of the invention preferably range from 1:5 to 1:1.

The following examples illustrate the invention:

EXAMPLE 1

A suspension containing 100 mg. of ferrous fumarate/teaspoonful was formulated as follows:

Ingredients

| | Grams |
|---|---|
| Non-hydrated ferrous fumarate | 20.4 |
| Tragacanth, U.S.P. | 5.0 |
| Colloidal synthetic silica (Cab-O-Sil M–5) | 3.0 |
| Sorbitol solution, U.S.P. (70%) | 807.5 |
| Preservative (sodium benzoate) | 1.0 |
| Flavoring and sweetening agents, q.s. | |
| Coloring agents, q.s. | |
| Water, q.s., 1000 ml. | |

Procedure

The tragacanth is added to a portion of the sorbitol solution requirement and the mixture is agitated until a smooth homogeneous dispersion is achieved. A major portion of the water requirement is added and the mixture is further agitated until a smooth, thick homogeneous dispersion is achieved. The preservative, coloring agents and water soluble flavoring agents are dissolved in another portion of the water requirement, and the solution is added slowly to the above dispersion. Additional flavoring agents, if any, are added slowly and the mixture is stirred until it is homogeneous.

To the homogeneous mixture prepared as described above, is added the colloidal silica. The remainder of the sorbitol solution requirement is added as the mixture is stirred to insure homogeneity. The ferrous fumarate is slowly sifted into the vortex of the stirred suspension, and stirring is continued until the ferrous fumarate is uniformly dispersed. The whole formulation is then homogenized and deareated, if necessary. The finished preparation is filled into amber bottles of appropriate size.

Storage tests indicate that the composition is stable over extended periods.

The proportions of the various ingredients indicated above may be varied if desired. For example, the following quantities (per 1000 ml.) may be employed: about 5-50 g., preferably about 10-40 g., ferrous fumarate; about 0.2-20 g., preferably about 2.5-10 g., tragacanth; about 0.1-30 g., preferably about 1-5 g., colloidal synthetic silica; and about 50-1000 g., preferably 500-900 g., sorbitol solution. As a general rule, if the sorbitol (or other polyol or sugar) content is reduced, the gum and/or silica content should be increased to provide a vehicle of adequate body and suitable stability and palatability.

In view of the above, it will be seen that the several objects of the invention are achieved and other advantageous results attained.

As many changes could be made in the above products and methods without departing from the scope of the invention, it is intended that all matter contained in the above description shall be interpreted as illustrative and not in a limiting sense.

What is claimed is:

1. A stable pharmaceutical composition comprising a relatively insoluble ferrous compound selected from the group consisting of non-hydrated ferrous fumarate and ferrous tartrate, a vegetable gum and colloidal synthetic silica in an aqueous vehicle, the amount of vegetable gum being between approximately 17.5% and 37.5% by weight based upon the weight of the ferrous compound and the amount of colloidal synthetic silica being between approximately 7.5% and 25.0% by weight based upon the weight of the ferrous compound.

2. A stable pharmaceutical composition as defined in claim 1 wherein the ferrous compound is non-hydrated ferrous fumarate.

3. A stable pharmaceutical composition as defined in claim 2 wherein the vegetable gum is tragacanth.

4. A stable pharmaceutical composition as defined in claim 2 wherein the aqueous vehicle is an aqueous solution of sorbitol.

5. A stable pharmaceutical composition comprising non-hydrated ferrous fumarate, approximately 25% by weight of tragacanth based upon the weight of ferrous fumarate, approximately 15% by weight of colloidal synthetic silica based upon the weight of ferrous fumarate, and an aqueous solution of sorbitol as a vehicle for said ferrous fumarate, tragacanth and colloidal synthetic silica.

References Cited

FOREIGN PATENTS

| | | |
|---|---|---|
| 653,605 | 1962 | Canada. |
| 851,761 | 1960 | England. |

OTHER REFERENCES

"The Condensed Chemical Dictionary," Reinhold (1963), p. 192.

Martin, E. W., et al.: "Husa's Pharmaceutical Dispensing," Mack (1959), pp. 184–189, 163, and 166.

SAM ROSEN, *Primary Examiner.*

S. SINGER, *Assistant Examiner.*